(12) United States Patent
Brinas (10) Patent No.: US 8,910,988 B2
(45) Date of Patent: Dec. 16, 2014

(54) ADAPTABLE BIN WITH FOLDING SECONDARY BIN

(71) Applicant: GM Global Technology Operations LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 13/858,152

(22) Filed: Apr. 8, 2013

(65) Prior Publication Data

US 2014/0300124 A1 Oct. 9, 2014

(51) Int. Cl.
*B60R 13/00* (2006.01)
*B60R 7/04* (2006.01)

(52) U.S. Cl.
CPC ........................................ *B60R 7/04* (2013.01)
USPC ...................................................... 296/24.34

(58) Field of Classification Search
CPC .. E25H 1/12; E25H 1/14; B65D 2519/00338; B65D 2519/00497; F25D 23/04; B62B 2501/065; B62B 2202/42; B62B 2205/10; A61G 1/0293; A62B 13/18
USPC ............. 296/24.34, 182.1; 211/119.003, 184; 280/47.19, 47.26, 640; 220/6; 312/408
See application file for complete search history.

(56) References Cited

U.S. PATENT DOCUMENTS

| | | | | |
|---|---|---|---|---|
| 4,184,602 | A * | 1/1980 | Moliard | 220/4.26 |
| 5,016,763 | A * | 5/1991 | Martin | 211/184 |
| 5,975,660 | A * | 11/1999 | Tisbo et al. | 312/263 |
| 6,623,059 | B2 * | 9/2003 | Gehring et al. | 296/37.5 |
| 6,663,203 | B1 * | 12/2003 | Miller, Jr. | 312/258 |
| 6,676,185 | B2 * | 1/2004 | Gehring et al. | 296/37.5 |
| 6,719,347 | B2 * | 4/2004 | Gehring et al. | 296/37.5 |
| 7,472,974 | B2 * | 1/2009 | Czach et al. | 312/405.1 |
| 7,784,632 | B2 * | 8/2010 | Truong | 220/7 |
| 7,900,392 | B2 * | 3/2011 | Musto | 43/54.1 |
| 8,210,622 | B2 * | 7/2012 | Forrest et al. | 312/330.1 |
| 8,714,613 | B1 * | 5/2014 | Gillis et al. | 296/24.34 |
| 2008/0271475 | A1 * | 11/2008 | Wuesthoff et al. | 62/447 |
| 2009/0194193 | A1 * | 8/2009 | Vonderhaar et al. | 141/65 |
| 2010/0170896 | A1 * | 7/2010 | Truong | 220/6 |
| 2011/0215606 | A1 * | 9/2011 | Trivedi | 296/24.34 |
| 2012/0277904 | A1 * | 11/2012 | Pritchard et al. | 700/232 |
| 2012/0326588 | A1 * | 12/2012 | Vonderhaar et al. | 312/406 |
| 2013/0009417 | A1 * | 1/2013 | Hipshier et al. | 296/24.34 |
| 2013/0310967 | A1 * | 11/2013 | Olson et al. | 700/214 |

* cited by examiner

*Primary Examiner* — Kiran B Patel
(74) *Attorney, Agent, or Firm* — Quinn Law Group, PLLC (57) ABSTRACT

An adaptable bin includes a bin floor, at least two bin side walls, and one or more bin end walls. The bin floor, bin side walls, and bin end wall define a primary storage volume and define a bin opening allowing access to the primary storage volume. The adaptable bin also includes a secondary shelf moveable between a collapsed position and an expanded position. The secondary shelf defines a secondary storage volume in the expanded position. The secondary shelf includes a first shelf segment and a first hinge, which rotatably connects the first shelf segment to the bin end wall, and a second shelf segment and a second hinge, which rotatably connects the first and second shelf segments. The first and second shelf segments are substantially parallel to the bin end wall in the collapsed position and are substantially perpendicular to the bin end wall in the expanded position.

14 Claims, 6 Drawing Sheets

Figure 4C

ADAPTABLE BIN WITH FOLDING SECONDARY BIN

TECHNICAL FIELD

This disclosure relates to storage bins, particularly those used in vehicles.

BACKGROUND

Storage bins may be used to hold various items in the vehicle, including electronics, vehicle accessories, or personal items. Some vehicles may include one or more storage bins between, or adjacent to, passenger seats. Occupants within the vehicle use the storage bins to store or secure various objects.

SUMMARY

An adaptable bin, such as those used in vehicles, is provided. The adaptable bin includes a bin floor, at least two bin side walls, and one or more bin end walls. The bin floor, the bin side walls, and the bin end wall define a primary storage volume within the adaptable bin. A bin opening is defined by the bin side walls and the bin end wall, and allows access to the primary storage volume.

The adaptable bin also includes a secondary shelf, which is moveable between a collapsed position and an expanded position. The secondary shelf selectively defines a secondary storage volume from within the primary storage volume when in the expanded position and allows access to substantially all of the primary storage volume of the adaptable bin in the collapsed position.

The secondary shelf includes a first shelf segment and a first hinge, which rotatably connects the first shelf segment to the bin end wall. The first shelf segment is substantially parallel to the bin end wall in the collapsed position and is substantially perpendicular to the bin end wall in the expanded position. The secondary shelf also includes a second shelf segment and a second hinge, which rotatably connects the second shelf segment to first shelf segment. The second shelf segment is substantially parallel to the bin end wall in the collapsed position and substantially perpendicular to the bin end wall in the expanded position.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
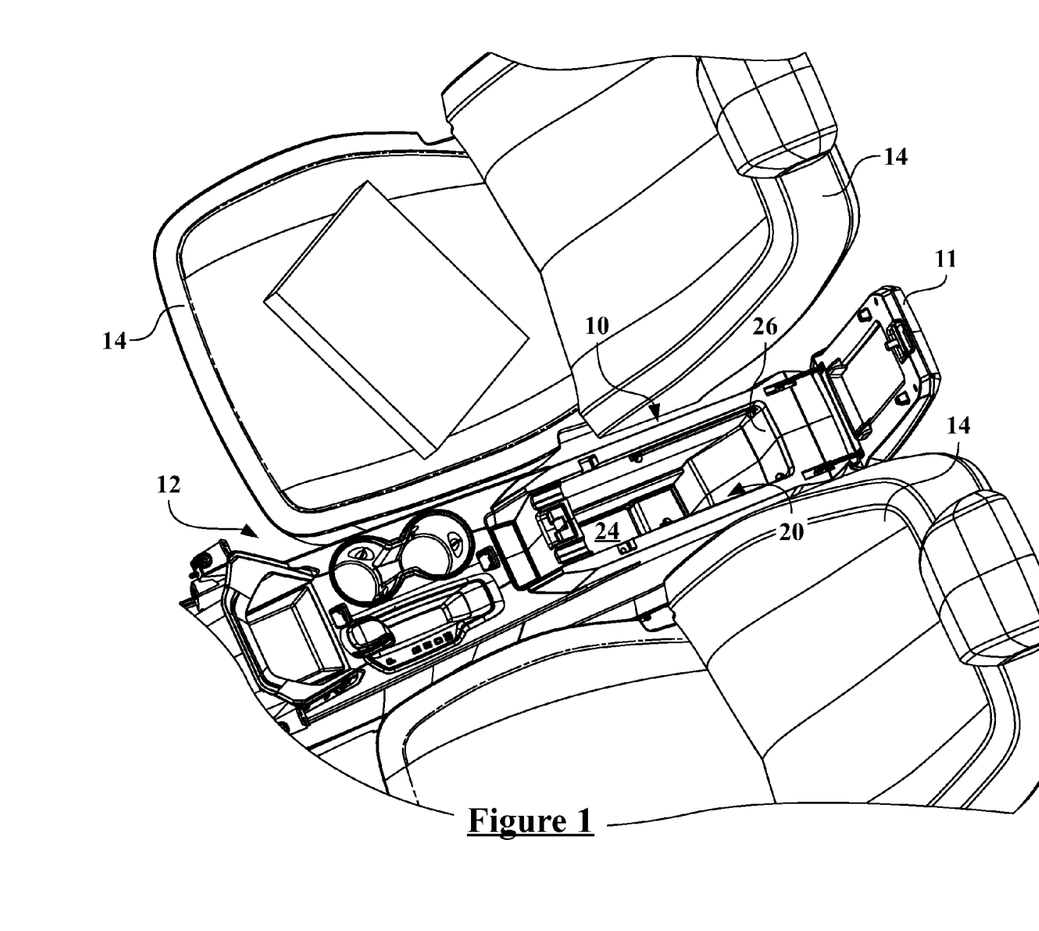
FIG. 1 is a schematic isometric top view of an adaptable bin disposed within a console between two passenger seats.

Referring to the drawings, like reference numbers correspond to like or similar components wherever possible throughout the several figures. FIG. 1 shows an adaptable bin 10 for a vehicle (not shown), which may be used for storage of numerous objects or components. The adaptable bin 10 may be located in the passenger compartment or elsewhere within the vehicle. A lid 11 selectively closes and substantially prevents access to the adaptable bin 10.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 is disposed within a console 12, which is generally located between passenger seats 14. However, the adaptable bin 10 may be located elsewhere, such as the interior side of a door, beneath a removeable rear seat cushion, on the dashboard, or within the trunk or boot.

Figure 2:
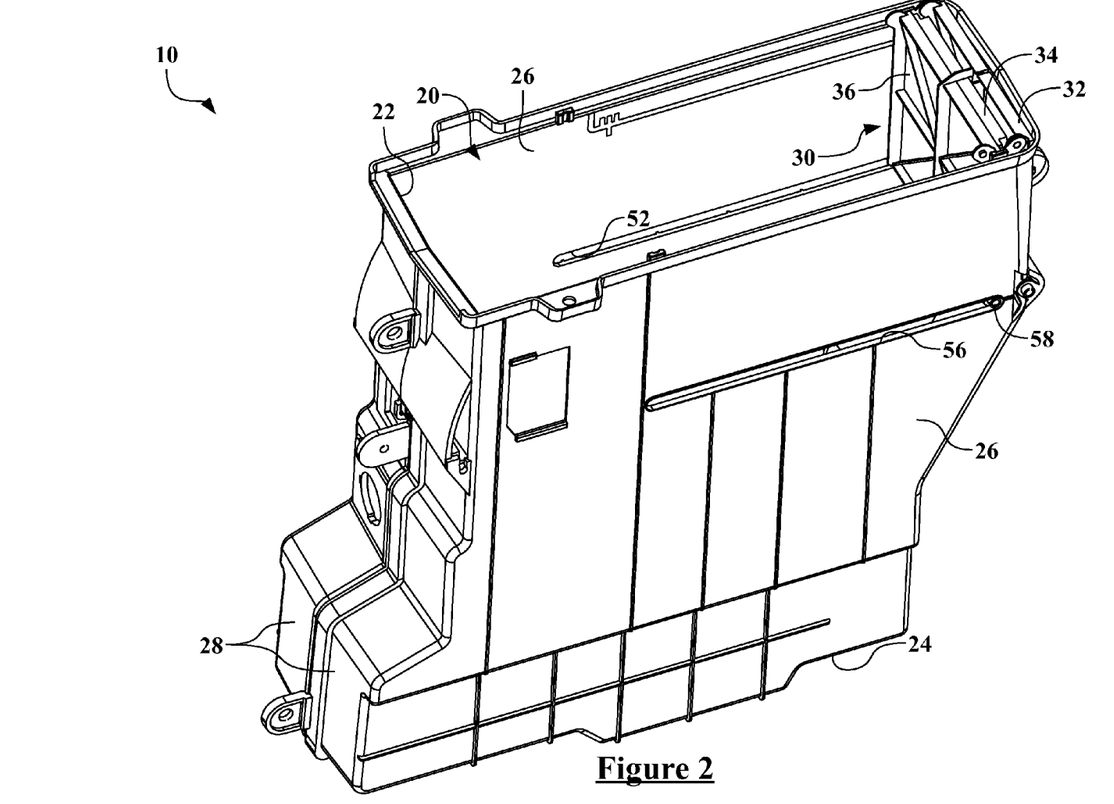
FIG. 2 is a schematic isometric view of the adaptable bin, shown with a secondary shelf in a fully collapsed position.

Referring also to FIG. 2, in addition to FIG. 1, there is shown another view of the adaptable bin 10. FIG. 2 shows the adaptable bin 10 without surrounding components of the vehicle.

The adaptable bin 10 defines a primary storage volume 20 accessible through a bin opening 22, which is at the top of the adaptable bin 10, relative to the likely orientation of the adaptable bin 10 within the vehicle. However, it should be understood that other orientations of the adaptable bin 10 are possible, and that angling the adaptable bin 10 slightly will have little measurable effect on its performance.

The adaptable bin 10 shown is formed from a bin floor 24, at least two bin side walls, or simply side walls 26, and at least one bin end wall, or simply end wall 28. The bin opening 22 is defined by the side walls 26 and end walls 28, and allows access to the primary storage volume 20.

The bin floor 24, side walls 26, and end walls 28 define the primary storage volume 20. Additionally, many configurations of the adaptable bin 10 will include the lid 11 or another closure that selectively closes the primary storage volume 20 by blocking access to the bin opening 22.

Figure 3:
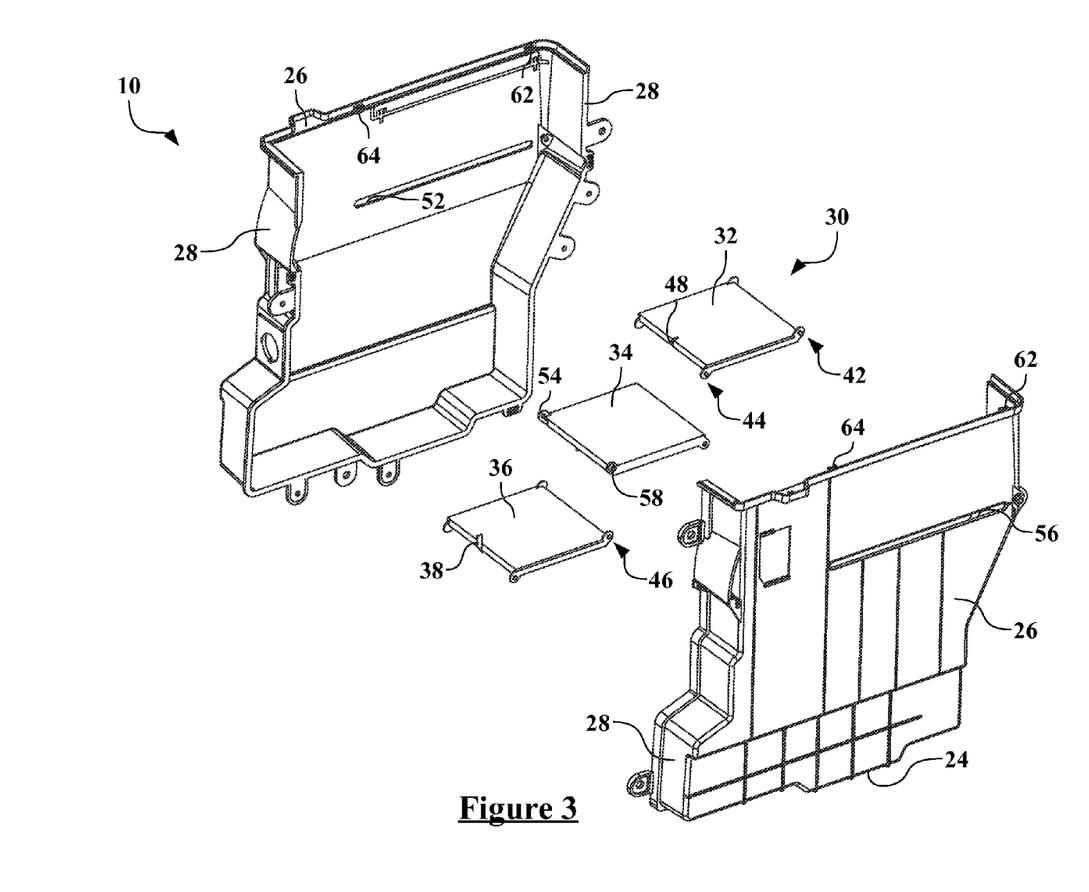
FIG. 3 is a schematic exploded isometric view of the adaptable bin.
Figure 4A:
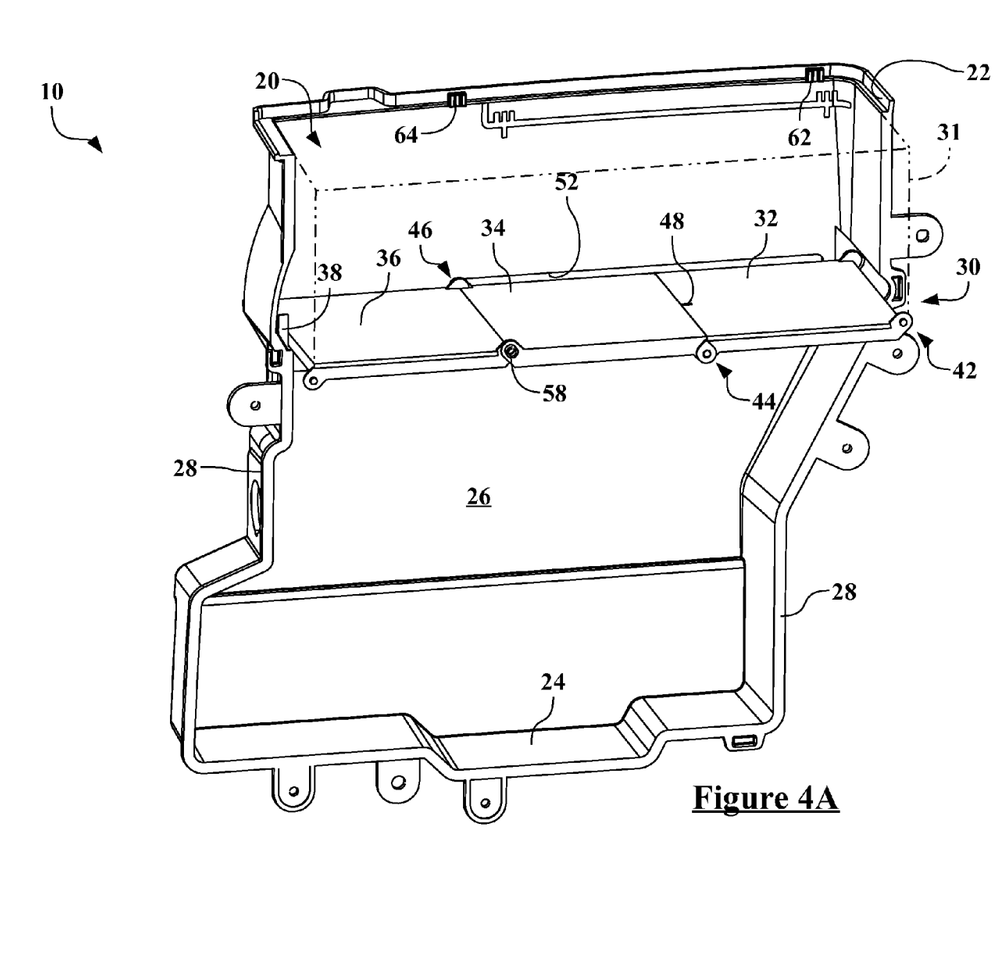
FIG. 4A is a schematic isometric view of a portion of the adaptable bin, shown with the secondary shelf in a fully expanded position.

Referring also to FIG. 2, to FIG. 3, and to FIG. 4A, and with continued reference to FIG. 1, there are shown additional illustrative views of the adaptable bin 10. FIG. 2 shows an isometric view of the adaptable bin 10 and FIG. 3 shows an exploded view of portions of the adaptable bin 10. FIG. 4A shows an isometric view of the adaptable bin 10 with one of the side walls 26 removed from view.

The adaptable bin 10 includes a folding bridge or secondary shelf 30, which is moveable between a collapsed position (as shown in FIG. 2, and also in FIG. 4E) and an expanded position (as shown in FIG. 4A). The secondary shelf 30 selectively defines a secondary storage volume 31 when in the expanded position, such that the secondary shelf 30 selectively varies the configuration of storage space and shape within the primary storage volume 20. The secondary storage volume 31 is formed from portions of the primary storage volume 20.

The secondary shelf 30 selectively forms a secondary bin within the adaptable bin 10 as it offsets the volume available in a primary bin, which occupies the remainder of the primary storage volume 20 not occupied by the secondary bin. The secondary storage volume 31 is shown only to illustrate the general area of storage created by the secondary shelf 30 and usable as the secondary bin.

The secondary shelf 30 is formed from multiple folding segments, including at least a first shelf segment 32 and a second shelf segment 34. The first shelf segment 32 and the second shelf segment 34 may be moved from substantially parallel to the bin end wall 28 in the collapsed position to substantially perpendicular to the bin end wall 28 in the expanded position.

In the adaptable bin 10 shown, the secondary shelf 30 also includes a third shelf segment 36, which allows further variability of the secondary shelf 30. The third shelf segment 36 is substantially parallel to the bin end wall 28 in the collapsed position and substantially perpendicular to the bin end wall 28 in the expanded position, but may also be moved into intermediate positions.

A first hinge 42 rotatably connects the first shelf segment 32 to one of the bin end walls 28 and a second hinge 44 rotatably connects the second shelf segment 34 to first shelf segment 32. Similarly, a third hinge 46 rotatably connects the third shelf segment 36 to second shelf segment 34. Therefore, the first hinge 42, second hinge 44, and third hinge 42 facilitate movement of the secondary shelf 30 between storage positions. The first hinge 42, second hinge 44, and third hinge 42 may be formed from any structure that allows rotation of the respective shelf segments, and may have more points of contact than those illustrated in the figures.

As illustrated in the figures, the secondary shelf 30 forms the secondary bin and then collapses to free the primary bin without needing to be detached or removed from the adaptable bin 10 in order to maximize the space available in the primary bin. The adaptable bin 10 provides flexibility for storage of different types and sizes of objects within different combinations of the same primary storage volume 20. Furthermore, the adaptable bin 10 provides this flexibility without the risk of losing the secondary shelf 30, which may be the case with removable bins.

Figure 4B:
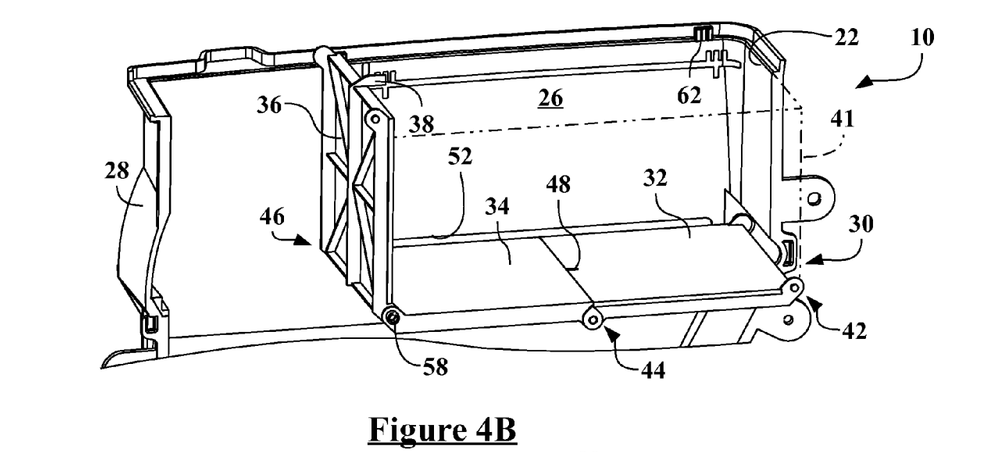
FIG. 4B is a schematic isometric view of a portion of the adaptable bin, shown with the secondary shelf in a first intermediate position.
Figure 4C:
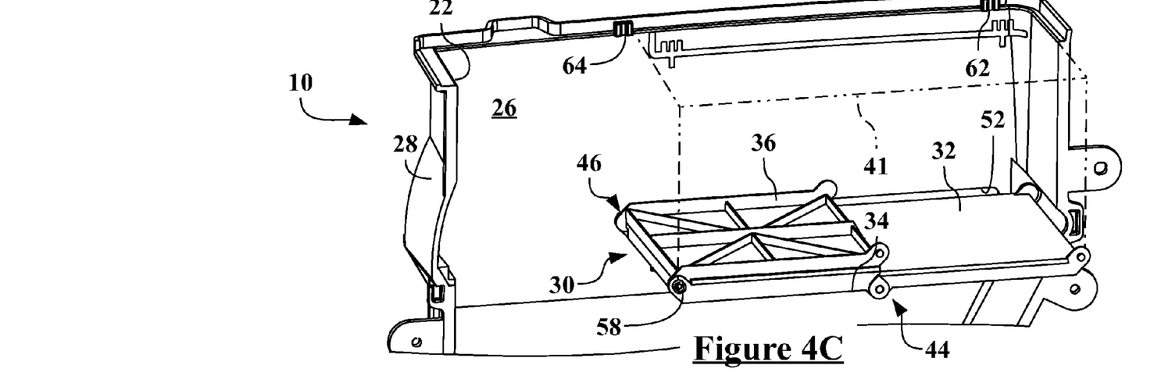
FIG. 4C is a schematic isometric view of a portion of the adaptable bin, shown with the secondary shelf in a second intermediate position.
Figure 4D:
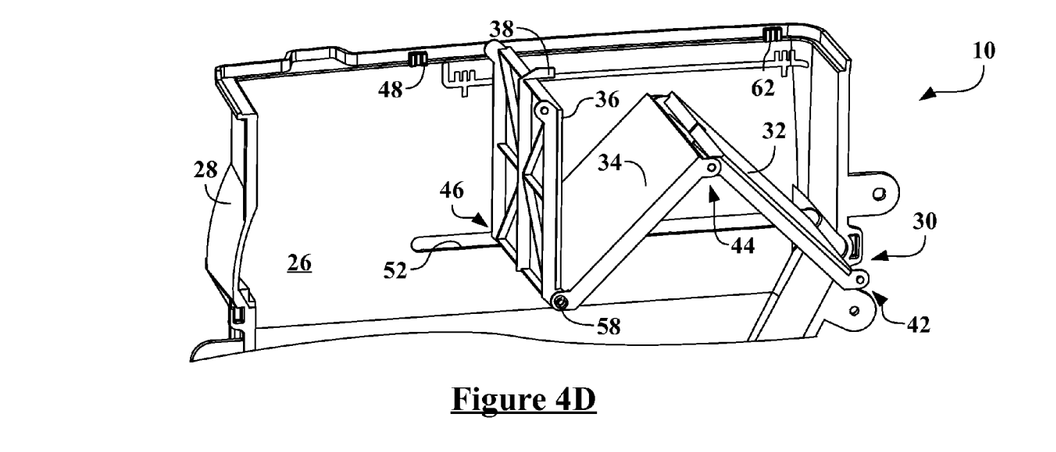
FIG. 4D is a schematic isometric view of a portion of the adaptable bin, showing with the secondary shelf moving between the first intermediate position and the fully collapsed position.
Figure 4E:
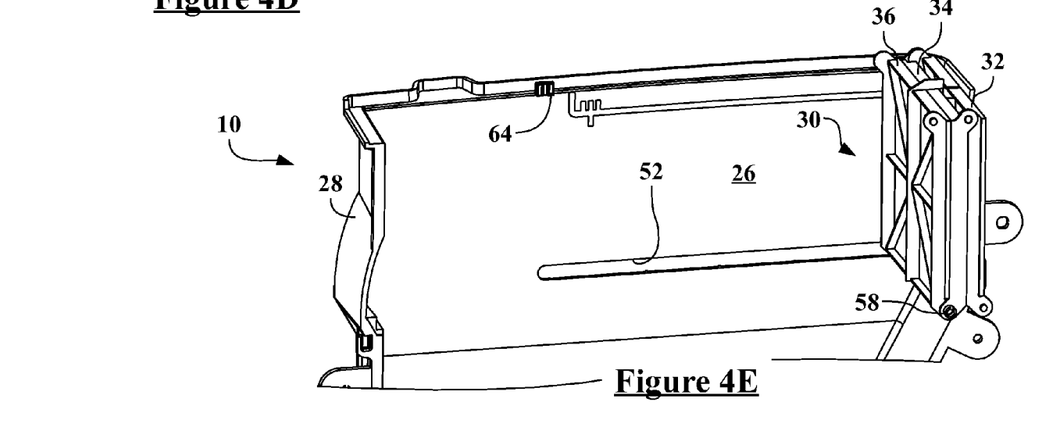
FIG. 4E is a schematic isometric view of a portion of the adaptable bin, shown with the secondary shelf in the fully collapsed position.

Referring also to FIGS. 4B, 4C, 4D, and 4E, and with continued reference to FIGS. 1-4A, there are shown additional views of the adaptable bin 10 with the secondary shelf 30 in various states between the expanded position (as shown in FIG. 4A) and the fully collapsed position (as shown in FIG. 4E). As shown in FIG. 4B and FIG. 4C, the secondary shelf 30 is also moveable to at least one intermediate position between the collapsed position and the expanded position. FIG. 4D illustrates the secondary shelf 30 moving between the intermediate position and the fully collapsed position.

The secondary shelf 30 selectively defines an intermediate storage volume 41, which is smaller than the secondary storage volume 31, when in one of the intermediate positions. The intermediate storage volume 41 is defined within the secondary storage volume 31 and within the primary storage volume 20, such that either the intermediate storage volume 41 or the secondary storage volume 31 selectively carve out portions of the primary storage volume 31 to vary the configuration of the adaptable bin 10.

The third shelf segment 36 is substantially parallel to the end walls 28 in a first intermediate position, as shown in FIG. 4B. The third shelf segment 36 is substantially perpendicular to the end walls 28 and laid on the second shelf segment 34 in a second intermediate position, as shown in FIG. 4C. The intermediate storage volume 41 is substantially equivalent in either of the first intermediate position or the second intermediate position. The intermediate storage volume 41 is shown only to illustrate the general area of storage created by the secondary shelf 30 in the intermediate positions.

As shown in the figures, the second hinge 44 is below the secondary shelf 30. Locating the second hinge 44 below the secondary shelf 30 may improve the ability of large objects to lay flat on the secondary shelf 30, particularly in the fully expanded position (shown in FIG. 4A) or the first intermediate position (shown in FIG. 4B).

In the adaptable bin 10, the shelf segment 30 includes a pull tab 38 formed on the third shelf segment 36. A tab slot 48 is formed on the first shelf segment 32. The tab slot 48 is configured to receive the pull tab 38 in one of the intermediate positions, such as the second intermediate position shown in FIG. 4C.

The adaptable bin 10 also includes a first guide slot 52 formed in one of the side walls 26. A first pin 54 is formed on, or coaxial with, the third hinge 46. The first pin 54 slides through the first guide slot 52 as the secondary shelf 30 moves between the collapsed position and the expanded position.

Similarly, a second guide slot 56 is formed in the side wall 26 opposite the first guide slot 52, and a second pin 58 is formed on the third hinge 46 opposite the first pin 54. Therefore, the secondary shelf 30 spans substantially between opposing side walls 26.

The second pin 58 slides through the second guide slot 56 between the collapsed position and the expanded position. The first guide slot 52 and the second guide slot 56 are both substantially parallel to the opening 22.

The adaptable bin 10 also includes features to help retain, lock, or hold the secondary shelf 30 in specific positions. These features are configured to prevent the secondary shelf 30 from unintentionally moving from one position to another, such as during movement of the vehicle or placement of items into the primary storage volume 20, without force being applied by the operator.

A first wall detent 62 is formed on at least one of the side walls 26. The first wall detent 62 retains the secondary shelf 30 in the collapsed position. A second wall detent 64 is formed on at least one of the side walls 26. The second wall detent 64 retains the secondary shelf 30 in one of the intermediate positions. The first wall detent 62 and the second wall detent 64 may be formed from, for example and without limitation, rubber, the same material formed the side walls 26, or another suitable material.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An adaptable bin, comprising:
 a bin floor;
 at least two bin side walls operatively attached to the bin floor;
 at least one bin end wall operatively attached to the bin side walls, wherein the bin floor, the bin side walls, and the bin end wall define a primary storage volume;
 a bin opening defined by the bin side walls and the bin end wall, wherein the bin opening allows access to the primary storage volume; and
 a secondary shelf operatively attached to the bin end wall and moveable between a collapsed position and an expanded position, wherein the secondary shelf selectively defines a secondary storage volume within the primary storage volume when in the expanded position, including:
  a first shelf segment;
  a first hinge rotatably connecting the first shelf segment to the bin end wall, wherein the first shelf segment is substantially parallel to the bin end wall in the collapsed position and substantially perpendicular to the bin end wall in the expanded position;
  a second shelf segment; and
  a second hinge rotatably connecting the second shelf segment to first shelf segment, wherein the second shelf segment is substantially parallel to the bin end wall in the collapsed position and substantially perpendicular to the bin end wall in the expanded position.

2. The adaptable bin of claim 1, further comprising:
 a third shelf segment; and
 a third hinge rotatably connecting the third shelf segment to second shelf segment, wherein the third shelf segment is substantially parallel to the bin end wall in the collapsed position and substantially perpendicular to the bin end wall in the expanded position.

3. The adaptable bin of claim 2, further comprising:
 a guide slot formed in one of the bin side walls substantially parallel to the opening; and
 a pin formed on the third hinge, wherein the pin slides through the guide slot between the collapsed position and the expanded position.

4. The adaptable bin of claim 3,
 wherein the secondary shelf is moveable to at least one intermediate position between the collapsed position and the expanded position, wherein the secondary shelf selectively defines an intermediate storage volume within the primary storage volume when in one of the intermediate positions, and
 wherein the intermediate storage volume is smaller than the secondary storage volume.

5. The adaptable bin of claim 4, further comprising:
 a pull tab formed on the third shelf segment.

6. The adaptable bin of claim 5, further comprising:
 a tab slot formed on the first shelf segment, wherein the tab slot is configured to receive the pull tab in one of the intermediate positions.

7. The adaptable bin of claim 6,
 a first wall detent formed on one of the bin side walls, wherein the first wall detent retains the secondary shelf in the collapsed position; and
 a second wall detent formed on one of the bin side walls, wherein the second wall detent retains the secondary shelf in one of the intermediate positions.

8. The adaptable bin of claim 7, wherein the second hinge is below the secondary shelf.

9. The adaptable bin of claim 8, wherein the guide slot is a first guide slot and the pin is a first pin, and further comprising:
 a second guide slot formed in the bin side wall opposite the first guide slot and substantially parallel to the opening; and
 a second pin formed on the third hinge opposite the first pin, wherein the second pin slides through the second guide slot between the collapsed position and the expanded position,
 wherein the secondary shelf spans between opposing bin side walls.

10. An adaptable bin, comprising:
 a bin floor;
 two bin side walls;
 two bin end walls, wherein the bin floor, the bin side walls, and the bin end walls define a primary storage volume;
 a bin opening defined by the bin side walls and the bin end walls, wherein the bin opening allows access to the primary storage volume;
 a first guide slot formed in one of the bin side walls substantially parallel to the opening;
 a second guide slot formed in the bin side wall opposite the first guide slot and substantially parallel to the opening;
 a secondary shelf operatively attached to one of the bin end walls and moveable between a collapsed position and an expanded position, wherein the secondary shelf selectively defines a secondary storage volume within the primary storage volume when in the expanded position, including:
  a first shelf segment;
  a first hinge rotatably connecting the first shelf segment to one of the bin end walls, wherein the first shelf segment is substantially parallel to the one of the bin end walls in the collapsed position and substantially perpendicular to the one of the bin end walls in the expanded position;
  a second shelf segment; and
  a second hinge rotatably connecting the second shelf segment to first shelf segment, wherein the second shelf segment is substantially parallel to the one of the bin end walls in the collapsed position and substantially perpendicular to the one of the bin end walls in the expanded position;
 a first pin formed on the secondary shelf, wherein the pin slides through the first guide slot between the collapsed position and the expanded position; and
 a second pin formed on the secondary shelf opposite the first pin, wherein the second pin slides through the second guide slot between the collapsed position and the expanded position.

11. The adaptable bin of claim 10, further comprising:
 a third shelf segment; and
 a third hinge rotatably connecting the third shelf segment to second shelf segment, wherein the third shelf segment is substantially parallel to the one of the bin end walls in the collapsed position and substantially perpendicular to the one of the bin end walls in the expanded position.

12. The adaptable bin of claim 11, further comprising:
 a pull tab formed on the third shelf segment; and
 a tab slot formed on the first shelf segment, wherein the tab slot is configured to receive the pull tab in one of the intermediate position.

13. The adaptable bin of claim 12,
wherein the secondary shelf is moveable to at least one intermediate position between the collapsed position and the expanded position, wherein the secondary shelf selectively defines an intermediate storage volume within the secondary storage volume when in one of the intermediate positions, and
wherein the intermediate storage volume is smaller than the secondary storage volume.

14. The adaptable bin of claim 13,
a first wall detent formed on one of the bin side walls, wherein the first wall detent retains the secondary shelf in the collapsed position; and
a second wall detent formed on one of the bin side walls, wherein the second wall detent retains the secondary shelf in one of the intermediate positions.

\* \* \* \* \*